(12) United States Patent
Browning et al.

(10) Patent No.: US 11,781,914 B2
(45) Date of Patent: Oct. 10, 2023

(54) COMPUTATIONAL RADIATION TOLERANCE FOR HIGH QUALITY INFRARED FOCAL PLANE ARRAYS

(71) Applicant: Sivananthan Laboratories, Inc., Bolingbrook, IL (US)

(72) Inventors: Nigel Browning, Formby (GB); Christopher Frank Buurma, Columbus, OH (US)

(73) Assignee: Sivananthan Laboratories, Inc., Bolingbrook, IL (US)

( * ) Notice: Subject to any disclaimer, the term of this patent is extended or adjusted under 35 U.S.C. 154(b) by 0 days.

(21) Appl. No.: 17/687,170

(22) Filed: Mar. 4, 2022

(65) Prior Publication Data

US 2022/0333996 A1 Oct. 20, 2022

Related U.S. Application Data

(60) Provisional application No. 63/156,482, filed on Mar. 4, 2021.

(51) Int. Cl.
*G01J 5/22* (2006.01)
*H04N 5/33* (2006.01)
*G01J 5/20* (2006.01)

(52) U.S. Cl.
CPC .......... *G01J 5/22* (2013.01); *H04N 5/33* (2013.01); *G01J 2005/202* (2013.01)

(58) Field of Classification Search
CPC ........ G01J 5/22; G01J 2005/202; H04N 5/33; H04N 5/2178
See application file for complete search history.

(56) References Cited

U.S. PATENT DOCUMENTS

| | | |
|---|---|---|
| 4,956,686 A | 9/1990 | Borrello et al. |
| 5,196,703 A | 3/1993 | Keenan |
| 5,431,328 A | 7/1995 | Chang et al. |
| 5,479,032 A | 12/1995 | Forrest et al. |
| 5,518,934 A | 5/1996 | Forrest et al. |
| 5,581,084 A | 12/1996 | Chapman et al. |
| 6,580,509 B1 | 6/2003 | Hutchin et al. |
| 6,657,194 B2 | 12/2003 | Ashokan et al. |
| 7,462,831 B2 | 12/2008 | Gooch et al. |
| 7,840,086 B2 * | 11/2010 | Bertozzi ............ G06T 5/005 382/254 |
| 8,233,148 B2 | 7/2012 | Bodkin et al. |
| 8,570,442 B2 | 10/2013 | Mestha et al. |
| 9,410,850 B2 | 9/2016 | Novotny et al. |
| 9,467,628 B2 | 10/2016 | Geng et al. |
| 9,538,098 B2 | 3/2017 | Hoye et al. |
| 9,883,178 B2 | 1/2018 | Chiu et al. |

(Continued)

*Primary Examiner* — David P Porta
*Assistant Examiner* — Gisselle M Gutierrez
(74) *Attorney, Agent, or Firm* — Erickson Law Group, PC

(57) ABSTRACT

An imaging system includes a focal plane array, readout electronics, and a computing system in which the number of active pixels is either set at a low-fraction of the total pixels thereby reducing the effect of radiation damage, or radiation damage over time is detected and automatically compensated. Machine learning is used to identify radiation damaged pixels and damaged regions which are subsequently eliminated and replaced by the computational system. The machine learning is used to identify changes in the fixed pattern signal/noise and/or noise of the system, and is then computationally corrected.

5 Claims, 4 Drawing Sheets

(56) References Cited

U.S. PATENT DOCUMENTS

| | | |
|---|---|---|
| 9,921,106 B1 | 3/2018 | Davis |
| 10,139,276 B2 | 11/2018 | Killey |
| 10,224,175 B2 * | 3/2019 | Stevens ................ H01J 37/222 |
| 10,256,072 B2 * | 4/2019 | Stevens ................ H01J 37/244 |
| 10,373,339 B2 | 8/2019 | Miller et al. |
| 10,431,419 B2 | 10/2019 | Kovarik et al. |
| 10,740,881 B2 | 8/2020 | Wang et al. |
| 11,056,314 B2 | 7/2021 | Hujsak et al. |
| 11,080,833 B2 | 8/2021 | Barnes et al. |

\* cited by examiner

COMPUTATIONAL RADIATION TOLERANCE FOR HIGH QUALITY INFRARED FOCAL PLANE ARRAYS

This application claims the benefit of U.S. Provisional Application 63/156,482, filed Mar. 4, 2021.

BACKGROUND

Known Infrared Focal Plane Arrays (IRFPAs) are used in a number of applications with high radiation environments. Many space applications have to mitigate cosmic ray effects, which can cause permanent "knock-on" damage to detector pixels. Some mechanisms used to reduce radiation damage in such IRFPAs are redundant pixels, reference pixels, and detector resets. The architecture for such IRFPAs includes addressable pixels in order to identify and remove radiation damage. These factors make the IRFPAs used for radiation environments extremely expensive and with limited lifetimes. The present inventors recognize a desire to reduce the effect of radiation damage in these detectors, and thus help increase radiation tolerance for IRFPAs.

SUMMARY

An imaging system is provided comprised of a focal plane array, readout electronics, and a computing system in which the number of active pixels is either set at a low-fraction of the total pixels thereby reducing the effect of radiation damage, or radiation damage over time is detected and automatically compensated.

Machine learning is used to identify radiation damaged pixels and damaged regions which are subsequently eliminated and replaced by the computational system. The machine learning is used to identify changes in the fixed pattern signal/noise and/or noise of the system, and is then computationally corrected.

Only the top percentage performing pixels are either initially or dynamically identified and used to reconstruct the entire image. Performance targets may be input externally during operation to dynamically adjust image quality and mean time to failure.

The present inventors recognize the desire to improve radiation damage tolerance through software. The present inventors recognize this could reduce cost by extending the lifetime of the IRFPA and reducing the complexity of the apparatus.

Some inpainting methods are known, such as disclosed in U.S. Pat. Nos. 7,840,086; 10,256,072 and 10,224,175, hereby incorporated by reference. The reconstruction of high-resolution images is possible using only a fraction of the original pixels and a computational method. However, these references are directed to color or grey-scale images or electron microscopes.

The exemplary method and system of the invention comprises an imaging system for IRFPAs whereby radiation damage is observed and mitigated using inpainting methods.

The inpainting approach uses only a small number of pixels to form the image, "inpainting" the missing pixels to form a high-resolution image. Especially when the missing pixels are randomly distributed in the image and are not clustered in large areas, then the resolution and sensitivity of the reconstructed image is essentially the same for sampling levels down to 5-10% of the original pixel array. The ability to use a small number of the existing pixels immediately makes the images faster and reduces the overall data content of the images (which are only at the full resolution when they are reconstructed). In addition, as most of the pixels are not being used in the image, these pixels form the redundancies that are needed to deal with radiation damage. There is no need to form an excess of pixels or a set of reference pixels as these exist automatically within the original array, which can be used either in its entirety or with a selected level of subsampling to form an initial image. Furthermore, if machine learning is used to identify where the radiation damage is coming into the reconstruction, damaged pixels in the original set can be turned off, and new undamaged pixels can be selected and used to inpaint the full image. Such an approach can significantly increase the lifetime of state-of-the-art FPAs used in high radiation conditions.

A subset of pixels is chosen from an IRFPA. An IR signal is collected by the IRFPA, hereby referred to as the "original signal." The original signal at each pixel in the subset is used as input to algorithms which calculate an IR signal at all of the pixels in the IRFPA. This signal is hereby referred to as the "reconstructed signal." The reconstructed signal includes the pixels that are part of the IRFPA but are not present in the subset, hereby referred to as the "missing pixels." If the missing pixels are randomly distributed in the IRFPA and are not clustered in large contiguous regions, then the resolution and sensitivity of the reconstructed signal is comparable to the original signal for subsampling levels down to 5-10% of the total pixels in the IRFPA. Using a fraction of the total pixels in the IRFPA makes signal acquisition faster and reduces the data storage demands for each signal.

The original signal can either be collected for all of the pixels in the IRFPA, or it may be collected only from the subset by turning off the missing pixels. In either case, the original signal at the missing pixels may not be used in the signal reconstruction.

If the missing pixels remain turned on for the original signal they can form the redundancies that are needed to detect and correct radiation damage. There is no need for a set of additional reference pixels, as the missing pixels in the IRFPA may be used. The missing pixels are used as reference pixels in order to calibrate the original signal.

Either direct observation of missing pixels or machine learning maybe be used on the original signal to identify radiation damage at pixels in the subset. When the radiation effects significantly reduce the ability to reconstruct the signal, pixels in the subset that are deemed damaged may be removed from the subset, and are replaced in the subset by different pixels from the IRFPA. This process can reduce the effect of radiation damage on the reconstructed signal.

Effective subsampling of pixels in IRFPAs can increase the lifetime of IRFPAs used in high radiation conditions, since the total number of pixels in the reconstruction input that may be altered by radiation damage is significantly reduced.

When the radiation effects significantly reduce the ability to inpaint the image, different pixels can be used to form the image giving the potential to extend the lifetime of the detector at the highest resolution.

The exemplary method and system of the invention uses a small fraction of the pixels to form an image with no loss of sensitivity or resolution. This automatically includes a wide range of reference pixels that can be used to calibrate the output.

By significantly reducing the number of pixels used to form the image, the active area that can be altered by radiation effects is significantly reduced.

Using machine learning, the effect of the radiation can be determined from each image.

Numerous other advantages and features of the present invention will be become readily apparent from the following detailed description of the invention and the embodiments thereof, and from the accompanying drawings.

DETAILED DESCRIPTION

Figure 1:
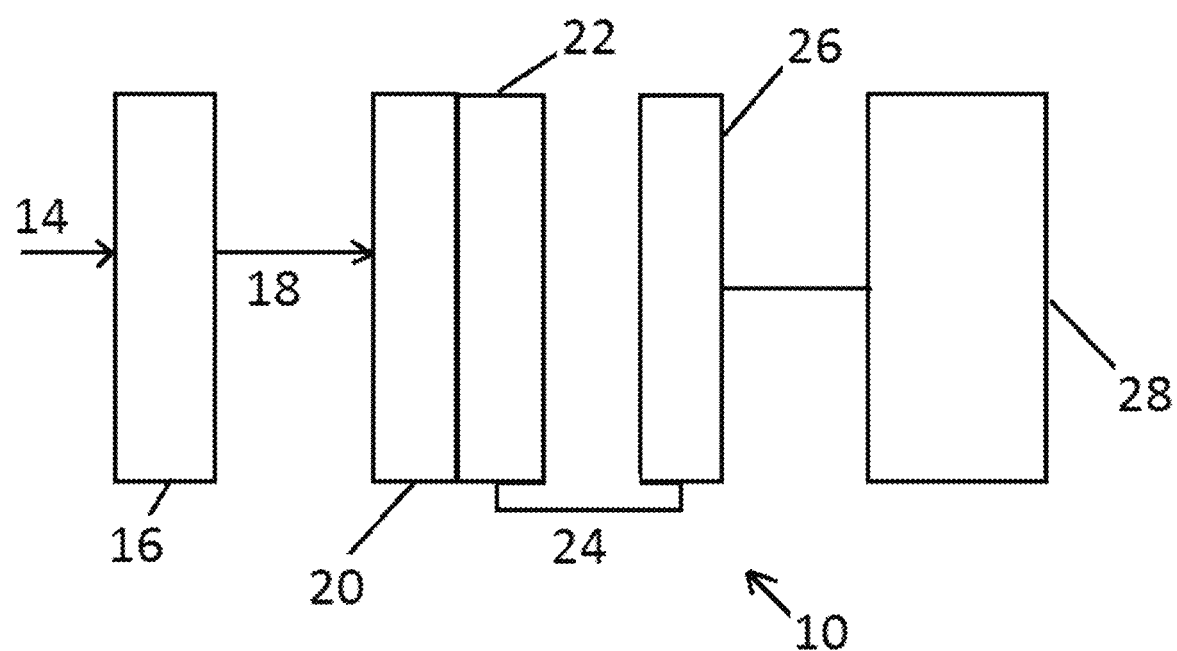
FIG. 1 is a schematic diagram of a system according to the invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

This application incorporates by reference U.S. Provisional Application 63/156,482, filed Mar. 4, 2021, in its entirety.

An imaging system 10 according to the invention is shown in FIG. 1. The system 10 may include optical components 16 receiving infrared radiation 14, one or more IRFPAs 20 receiving infrared radiation from the optical components 16, readout electronics 22, such as a read-out integrated circuit generating signals 24 corresponding to the working pixels of the IRFPA 20, control electronics 26 receiving the signals 24, and a computing system 28 receiving signals from the control electronics. The computing system 28 chooses signals corresponding to a subset of the working pixels.

Using an inpainting method, the computing system 28 outputs a reconstructed image approximating the image otherwise generated by all of the working pixels from the subset of the working pixels. The output from the computing system can be to a user interface, such as to a screen.

Machine learning by the computing system 28 can be used to identify radiation damaged pixels and damaged regions of pixels. These damaged pixels or damaged regions of pixels which are subsequently eliminated and replaced by the computational system.

Machine learning by the computing system can also be used to identify changes in any fixed pattern noise of the system, and the output can be computationally corrected.

A top percentage of performing pixels can be dynamically identified and used to reconstruct the entire image.

Performance targets may be input externally during operation to dynamically adjust image quality and mean time to failure.

Figure 2:
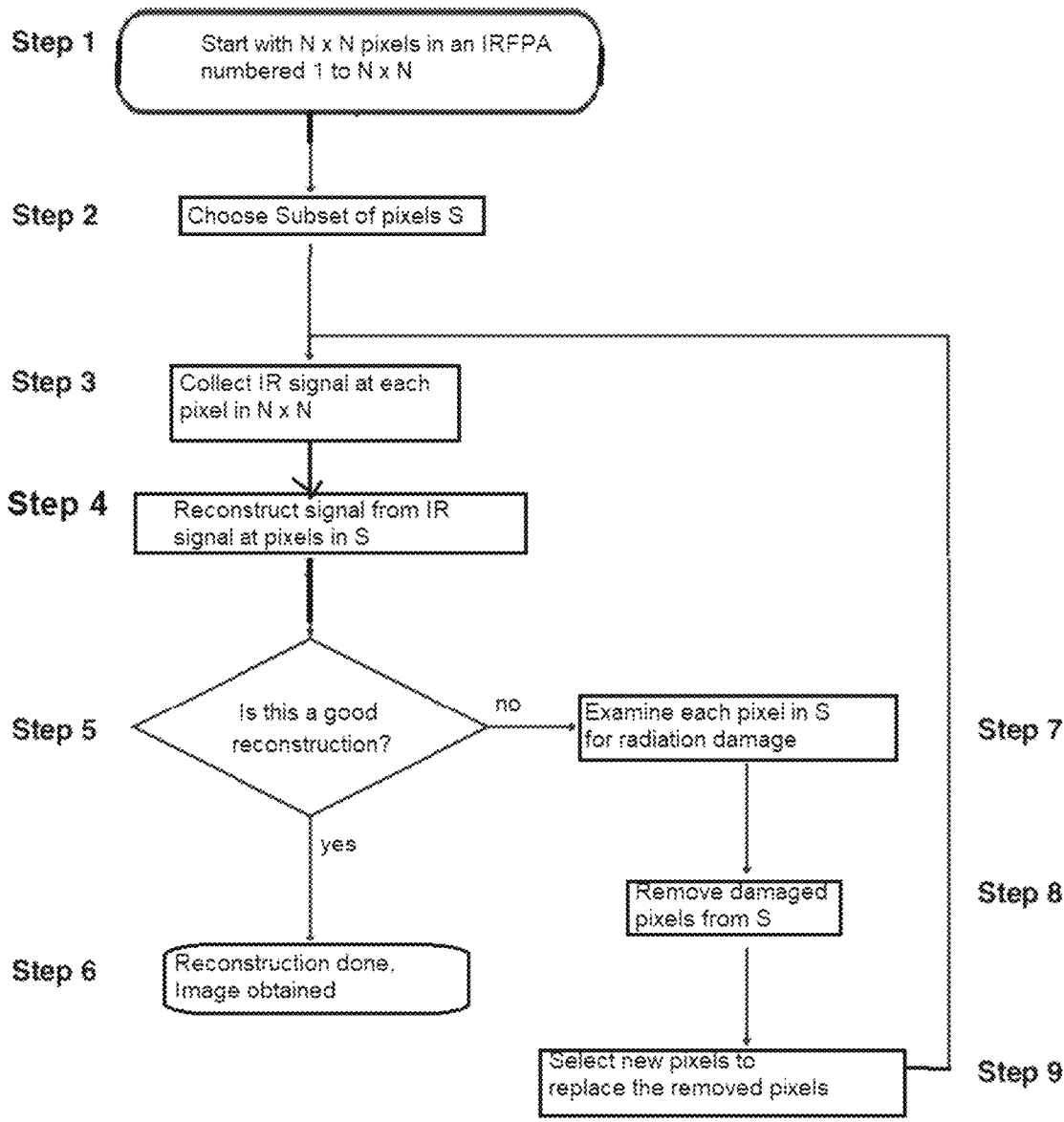
FIG. 2 is a flow diagram of one method according to the invention.

FIG. 2 demonstrates one exemplary method of this invention.

Step 1: Start with an IRFPA with N×N total pixels.

Step 2: Choose some subset of those N×N pixels, call this subset S.

Step 3: Collect an IR signal at all of the N×N total pixels.

Step 4: Using the IR signal at only the pixels in the subset S, use a reconstruction algorithm to calculate a reconstructed signal at all of the N×N total pixels.

Step 5: Ask if this reconstructed signal satisfies some metric, to determine if the reconstruction is "good." If yes move to Step 6, if no move to Step 7 after this step.

Step 6: The process is done since the reconstructed signal was satisfactory.

Step 7: Examine each pixel in the subset S for radiation damage, perhaps by using the extra pixels in the IRFPA not included in S.

Step 8: Remove pixels determined to be damaged from the subset S.

Step 9: Select new pixels to replace the damaged pixels in the subset S, and move back to step 3.

Figure 3:
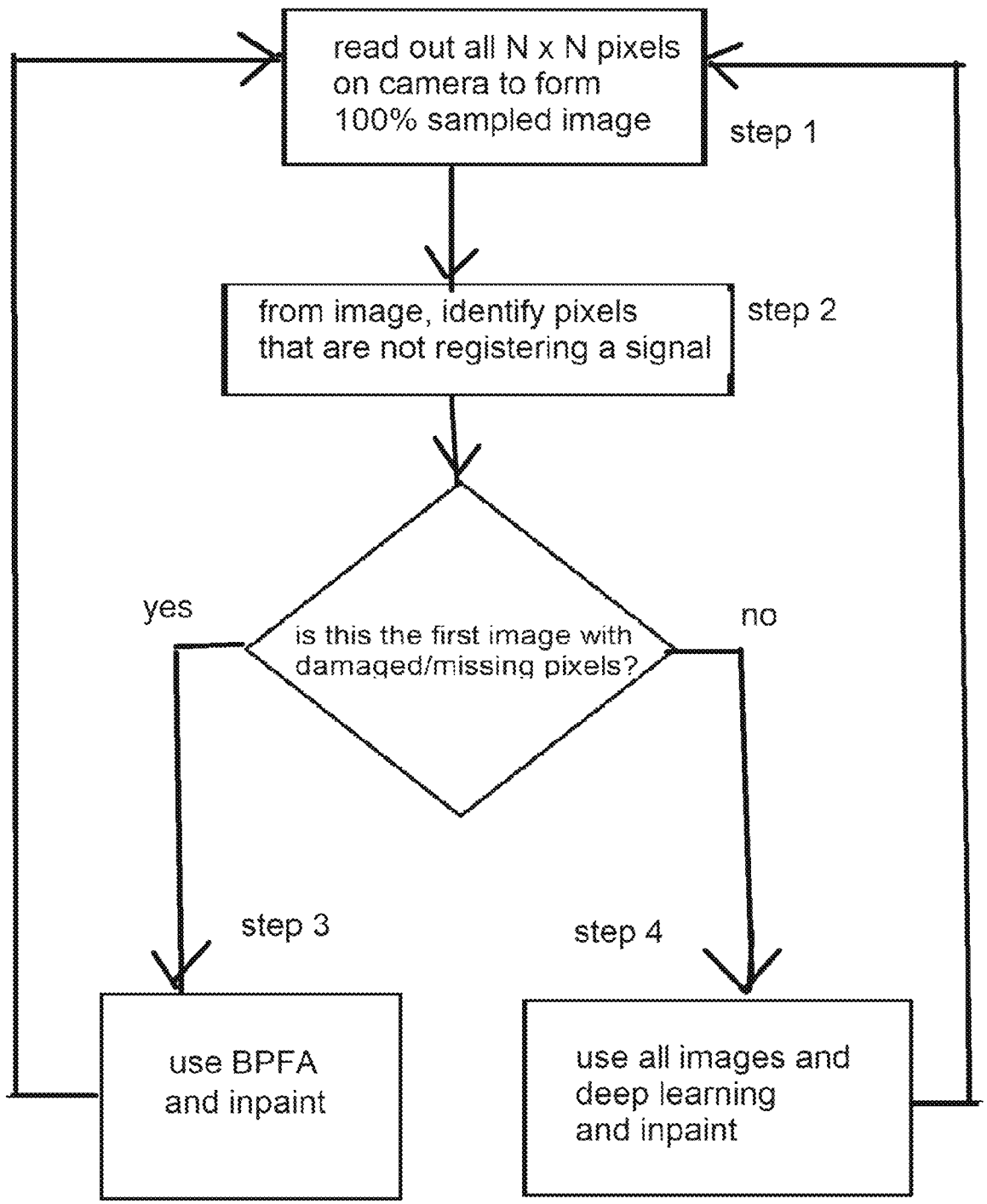
FIG. 3 is a flow diagram of another method according to the invention.

Another exemplary method of the invention is shown in flow diagram of FIG. 3 and provides that the subset S comprises all undamaged pixels from the original image of N×N pixels. The subset S of pixels is dictated by the radiation damage. The selection of the subset is arbitrary and is determined from the missing pixels seen in the image of N×N.

In general, a detector works by measuring the number of photons (IR, visible, X-rays) or charged particles (electrons, protons, neutrons). The number of photons/particles (sometimes just termed as the radiation) hitting a pixel is called a "count." If the number of counts, i.e., the intensity (I) is zero, then there is no information in that pixel. The condition I=0 can arise if there is just not enough intensity landing on the camera, or if the pixel has been damaged in some way. According to an exemplary method of the invention, a method of inpainting (a form of artificial intelligence related to compressive sensing) fills in the missing information. To fill in the missing information, pixels for which I=0 are identified. This arrangement of I=0 pixels is called the "mask".

According to the method, the array is used to reconstruct the missing or I=0 pixels using inpainting to reconstruct a full image, i.e., what it would look like if there wasn't any damage. As a camera undergoes damage, the number of pixels that can register an intensity is reduced, which means that images from a camera that is damaged get worse and worse as the damage proceeds. To overcome damage issues, many cameras employ what is known as radiation hardening—this is building in redundant electronics for the detection and read-out so that there has to be significant damage before a pixel is really a dead pixel. This redundant electronics is used to cope with damage and is expensive to employ—radiation hardened cameras are significantly more expensive than non-radiation hardened systems. According to methods of the invention, a software fix addresses the problem of damage which means it is cost effective to employ as there is no special processing required. A full image can be reconstructed with no loss of sensitivity from only 5% or less of the pixels in the camera (i.e. up to a 95% damage rate).

The process is as follows:

Step 1: Read out all N×N pixels on the camera to form a 100% sampled image

Step 2: From the image, identify if there are pixels that are not registering a signal (there will be dark spots in the image)

Step 3: If this is the first image with damaged/missing pixels, use BPFA to form dictionary and reconstruct the full image using inpainting (with any inpainting algorithm) and return to step 1

Step 4: If this is the second or more image from the same damage/missing pixel array, use all images from current non-damaged array to form improved dictionary (using deep learning) and reconstruct the full image by inpainting (using any inpainting algorithm) and return to step 1. Step 1 assumes no damaged pixels.

A dictionary is an array of sub-images used to reconstruct the full image. A dictionary learning method is known and examples are described in U.S. Pat. Nos. 9,467,628 and 10,431,419, both herein incorporated by reference.

Inpainting techniques are known and examples are described in U.S. Pat. Nos. 9,467,628; 10,431,419; 11,056314; 10,740,881 and 11,080,833.

There are two possible approaches to recovering images from damaged detectors, i.e., detectors where a given number of pixels do not read a signal. The two processes are either BPFA, in which the dictionary and reconstruction are determined for each individual image, or deep learning where a set of images is used to determine the dictionary and then reconstruct the image.

BPFA is the acronym for Beta-Process Factor Analysis. The analysis is known and examples are described in detail in U.S. Pat. Nos. 10,431,419 and 11,056,314, both herein incorporated by reference.

A deep learning method is known and examples of such are described in U.S. Pat. Nos. 10,740,881 and 11,080,833, both herein incorporated by reference.

Figure 4:
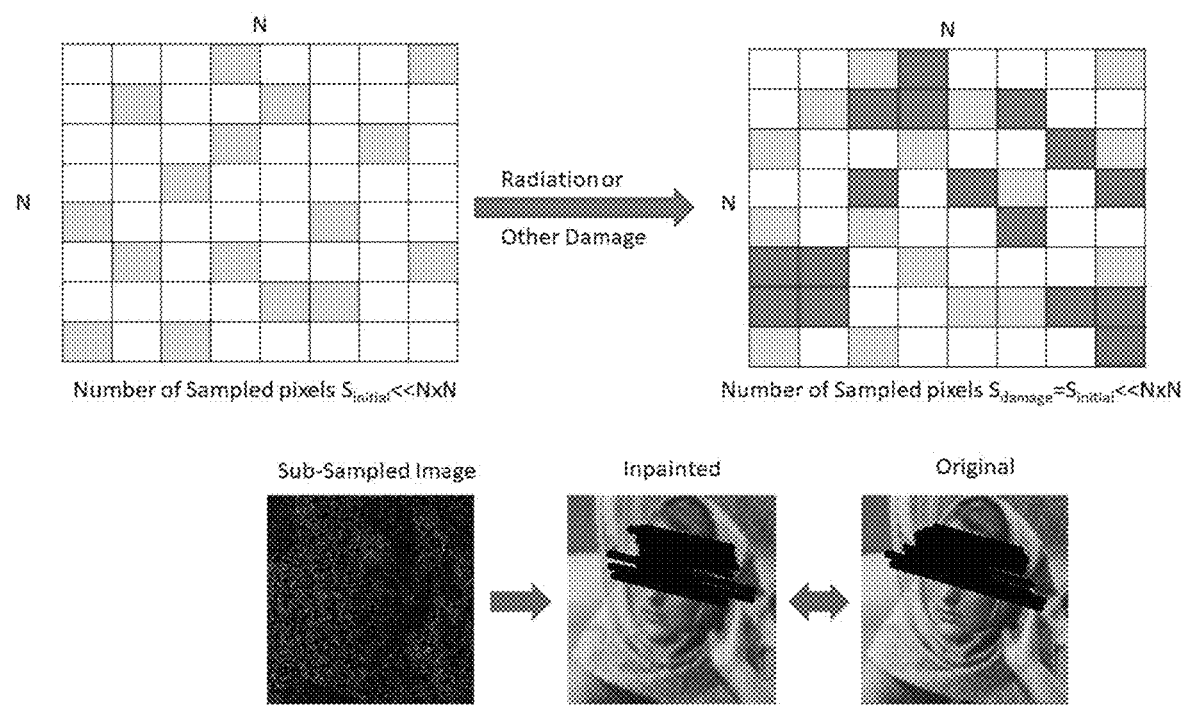
FIG. 4 is a demonstrative figure.

FIG. 4 is a demonstrative figure showing pixels that are radiation damaged.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. An imaging system comprising:
a focal plane array,
readout electronics in communication with the focal plane array, and
a computing system in communication with the readout electronics in which radiation damage over time is detected and automatically compensated.

2. A system from claim 1 in which machine learning is used to identify radiation damaged pixels and damaged regions which are subsequently eliminated and replaced by the computational system.

3. A system from claim 1 in which machine learning is used to identify changes in the fixed pattern noise of the system, and is then computationally corrected.

4. A system from claim 1 in which only the top percentage performing pixels are dynamically identified and used to reconstruct the entire image.

5. Any system from claim 1 in which performance targets may be input externally during operation to dynamically adjust image quality and mean time to failure.

* * * * *